US011985533B2

(12) United States Patent
Iwatani et al.

(10) Patent No.: US 11,985,533 B2
(45) Date of Patent: May 14, 2024

(54) WIRELESS COMMUNICATION SYSTEM, AGGREGATION DEVICE, INTERFERENCE SOURCE AIR TIME ACQUISITION METHOD, AND INTERFERENCE SOURCE AIR TIME ACQUISITION PROGRAM

(71) Applicant: Nippon Telegraph and Telephone Corporation, Tokyo (JP)

(72) Inventors: Junichi Iwatani, Tokyo (JP); Hiroyuki Nakamura, Tokyo (JP); Tomoaki Ogawa, Tokyo (JP); Makoto Umeuchi, Tokyo (JP); Shinya Otsuki, Tokyo (JP); Hiroshi Sakamoto, Tokyo (JP); Masayoshi Nabeshima, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 386 days.

(21) Appl. No.: 17/272,709

(22) PCT Filed: Sep. 13, 2019

(86) PCT No.: PCT/JP2019/036095
§ 371 (c)(1),
(2) Date: Mar. 2, 2021

(87) PCT Pub. No.: WO2020/059656
PCT Pub. Date: Mar. 26, 2020

(65) Prior Publication Data
US 2021/0377776 A1    Dec. 2, 2021

(30) Foreign Application Priority Data

Sep. 20, 2018  (JP) ................................ 2018-176643

(51) Int. Cl.
*H04W 28/02*   (2009.01)
*H04B 17/345*  (2015.01)
(Continued)

(52) U.S. Cl.
CPC ...... *H04W 28/0236* (2013.01); *H04B 17/345* (2015.01); *H04W 16/14* (2013.01); *H04W 16/18* (2013.01); *H04W 28/22* (2013.01)

(58) Field of Classification Search
CPC . H04W 28/0236; H04W 16/14; H04W 16/18; H04W 28/22; H04W 24/10; H04B 17/345; Y02D 30/70
See application file for complete search history.

(56) References Cited

U.S. PATENT DOCUMENTS

2009/0059851 A1\*  3/2009  Weil ...................... H04W 16/10
                                                           370/329
2009/0059873 A1    3/2009  Weil et al.
(Continued)

OTHER PUBLICATIONS

Rtpro.yamaha.co.jp, [online], "Wireless LAN visualization tool function," Nov. 25, 2016, retrieved on Jul. 24, 2018, retrieved from URL<http://www.rtpro.yamaha.co.jp/RT/docs/visualization/index.html>, 90 pages (with English Translation).

*Primary Examiner* — Ivan O Latorre
(74) *Attorney, Agent, or Firm* — Fish & Richardson P.C.

(57) ABSTRACT

There are provided a plurality of radio devices detecting an interference source signal transmitted by an interference source and generating pieces of air time information showing whether the interference source signal exists or not for each predetermined time unit; and an aggregation device estimating air time of the interference source by acquiring the pieces of air time information from the plurality of radio devices and aggregating/integrating the acquired pieces of air time information for each predetermined unit time, matching timings.

10 Claims, 4 Drawing Sheets

(51) Int. Cl.
*H04W 16/14* (2009.01)
*H04W 16/18* (2009.01)
*H04W 28/22* (2009.01)

(56) References Cited

U.S. PATENT DOCUMENTS

| | | | | |
|---|---|---|---|---|
| 2012/0164950 | A1* | 6/2012 | Nentwig | H04B 17/24 |
| | | | | 455/114.2 |
| 2015/0230111 | A1* | 8/2015 | Wang | H04W 24/04 |
| | | | | 370/252 |
| 2015/0365180 | A1* | 12/2015 | Björkén | H04W 24/02 |
| | | | | 455/296 |
| 2017/0048721 | A1* | 2/2017 | Sun | H04W 16/16 |
| 2017/0064564 | A1* | 3/2017 | Yun | H04B 17/345 |
| 2017/0272186 | A1* | 9/2017 | Yang | H04L 47/6245 |
| 2021/0143848 | A1* | 5/2021 | Hirata | H04W 16/14 |

\* cited by examiner (1) CONFIGURATION EXAMPLE

AIR TIME INFORMATION:
- REFERENCE TIME: T
- TIME UNIT: D
- IDENTIFICATION INFORMATION ABOUT INTERFERENCE SOURCE
- WHETHER INTERFERENCE SOURCE SIGNAL HAS BEEN DETECTED OR NOT (2) AIR TIME INFORMATION OF AP AND STA AND AIR TIME OF INTERFERENCE SOURCE (1) CONFIGURATION EXAMPLE (2) EXAMPLE OF DETECTION OF INTERFERENCE SOURCE SIGNAL AT AP

WIRELESS COMMUNICATION SYSTEM, AGGREGATION DEVICE, INTERFERENCE SOURCE AIR TIME ACQUISITION METHOD, AND INTERFERENCE SOURCE AIR TIME ACQUISITION PROGRAM

CROSS-REFERENCE TO RELATED APPLICATIONS

This application is a National Stage application under 35 U.S.C. § 371 of International Application No. PCT/JP2019/036095, having an International Filing Date of Sep. 13, 2019, which claims priority to Japanese Application Serial No. 2018-176643, filed on Sep. 20, 2018. The disclosure of the prior application is considered part of the disclosure of this application, and is incorporated in its entirety into this application.

TECHNICAL FIELD

The present invention relates to a radio communication system performing data communication using radio, the radio communication system acquiring a radio signal transmission state (air time) of an interference source (especially radio devices that are not management targets) near management target radio devices constituting the radio communication system, an aggregation device, an interference source air time acquisition method and an interference source air time acquisition program.

BACKGROUND ART

Conventionally, it has been difficult to, when there is an interference source around management target radio devices, accurately grasp a degree of influence of the interference source. The reason is that radio base stations (APs) 10 and 20 in a radio communication system shown in FIG. 5 cannot detect an interference source signal transmitted by an interference source 51 if the radio base stations 10 and 20 are transmitting/receiving their signals, and a radio base station which is not transmitting/receiving signals can only fragmentarily grasp a radio signal transmission state (air time) of the interference source 51. Furthermore, it is also a reason that, since only information about a part of management target radio devices, especially the radio base stations 10 and 20 that are connected to an aggregation device (a server) 100 via a network is referred to, the amount of information is small.

For example, in a case described in Non-Patent Literature 1, the degree of influence of a nearby interference access point is only indicated by three stages, and detailed numerical values are not shown. Further, a channel use rate of only an interference source is not displayed.

CITATION LIST

Non-Patent Literature

Non-Patent Literature 1: "Wireless LAN Visualization Tool Function", www.rtpro.yamaha.co.jp

SUMMARY OF THE INVENTION

Technical Problem

In order to solve the problem of the conventional technique, it is necessary to, though there are variations in the timing when management target radio devices can detect an interference source signal transmitted by an interference source, aggregate/integrate pieces of detection information of the management target radio devices. Furthermore, means for increasing reference information is required, such as not only performing monitoring only by radio base stations connected to a network but also referring to an interference source signal detected by radio terminals under control of the radio base stations.

An object of the present invention is to provide a radio communication system capable of detecting an interference source signal by management target radio devices, aggregating/integrating pieces of detection information of the management target radio devices and acquiring a radio signal transmission state (air time) of an interference source, an aggregation device, an interference source air time aggregation method and an interference source air time aggregation program.

Means for Solving the Problem

A radio communication system of a first invention includes: a plurality of radio devices detecting an interference source signal transmitted by an interference source and generating pieces of airtime information showing whether the interference source signal exists or not for each predetermined time unit; and an aggregation device estimating air time of the interference source by acquiring the pieces of air time information from the plurality of radio devices and aggregating/integrating the acquired pieces of air time information for each predetermined unit time, matching timings.

In the radio communication system of the first invention, the aggregation device may be configured to manage reference time T and a time unit D in order to match timings of the plurality of radio devices detecting the interference source signal, and notify the plurality of radio devices of the reference time T and the time unit D as air time management information. The plurality of radio devices are at least one radio base station connected to the aggregation device and at least one radio terminal under control of the radio base station, and the air time management information may be configured to be notified the radio base station from the aggregation device and further notified the radio terminal under the control of the radio base station from the radio base station.

In the radio communication system of the first invention, the plurality of radio devices may be configured to transmit detection levels of the interference source signal and pieces of position information about the radio devices to the aggregation device as the pieces of air time information; and the aggregation device may be configured to estimate a position of the interference source from the detection levels of the interference source signal at the plurality of radio devices and the pieces of position information about the plurality of radio devices.

In the radio communication system of the first invention, the aggregation device may be configured to analyze a tendency pattern of the estimated air time of the interference source, predict future air time of the interference source according to the tendency pattern, determine a transmission timing advantageous to the radio devices and notify the radio devices of the transmission timing.

A second invention is an aggregation device connected to a plurality of radio devices, the plurality of radio devices detecting an interference source signal transmitted by an interference source and generating pieces of air time information showing whether the interference source signal exists or not for each predetermined time unit, the aggregation device including processing means estimating air time of the interference source by acquiring the pieces of air time information from the plurality of radio devices and aggregating/integrating the acquired pieces of air time information for each predetermined unit time, matching timings.

An interference source air time acquisition method of a third invention includes the steps of: a plurality of radio devices detecting an interference source signal transmitted by an interference source and generating pieces of air time information showing whether the interference source signal exists or not for each predetermined time unit; and an aggregation device connected to the plurality of radio devices estimating air time of the interference source by acquiring the pieces of air time information from the plurality of radio devices and aggregating/integrating the acquired pieces of air time information for each predetermined unit time, matching timings.

An interference source air time acquisition program of a fourth invention causes a computer to execute a process executed by the aggregation device of the second invention to estimate air time of the interference source by acquiring the pieces of air time information from the plurality of radio devices and aggregating/integrating the acquired pieces of air time information for each predetermined unit time, matching timings.

Effects of the Invention

The present invention can clarify a radio signal transmission state (air time) of an interference source by detecting an interference source signal by management target radio devices (a radio base station and radio terminals) and aggregating/integrating pieces of detection information, and, therefore, it becomes possible to grasp a degree of influence of the interference source.

Further, by referring to pieces of position information about the management target radio devices and detection levels of the interference source signal, it becomes possible to estimate a position of the interference source. Furthermore, by predicting future air time from past air time, appropriate transmission timing control for the management target radio devices becomes possible.

DESCRIPTION OF EMBODIMENTS

First Embodiment

Figure 1:
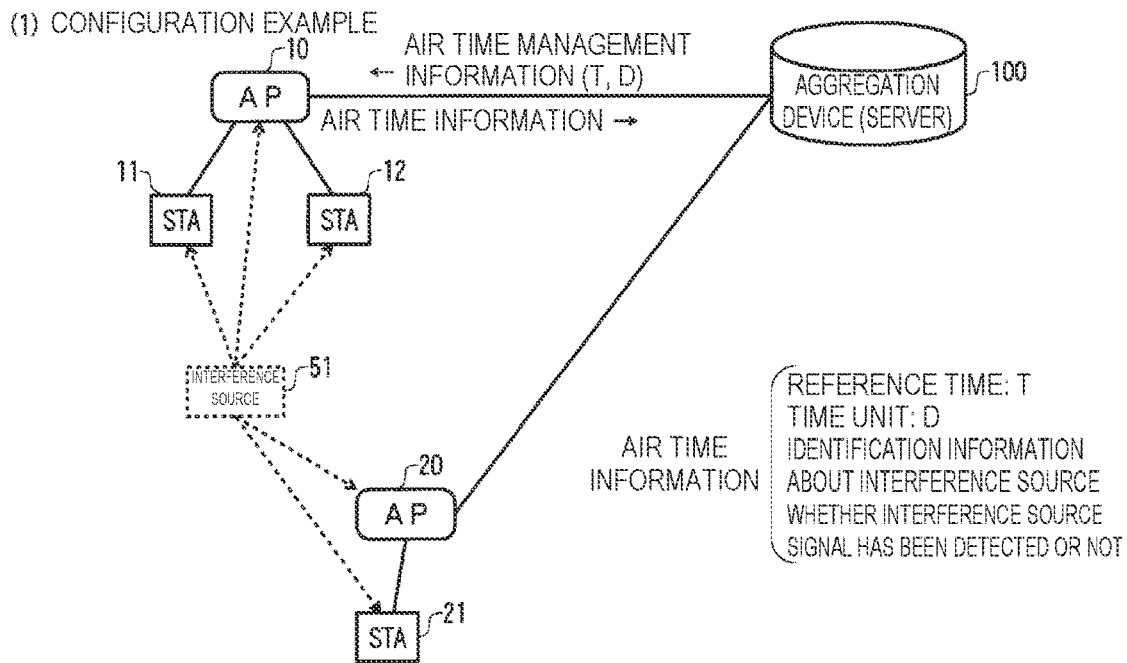
FIG. 1 is a diagram showing a first embodiment of interference source air time information aggregation in a radio communication system of the present invention.
Figure 1:
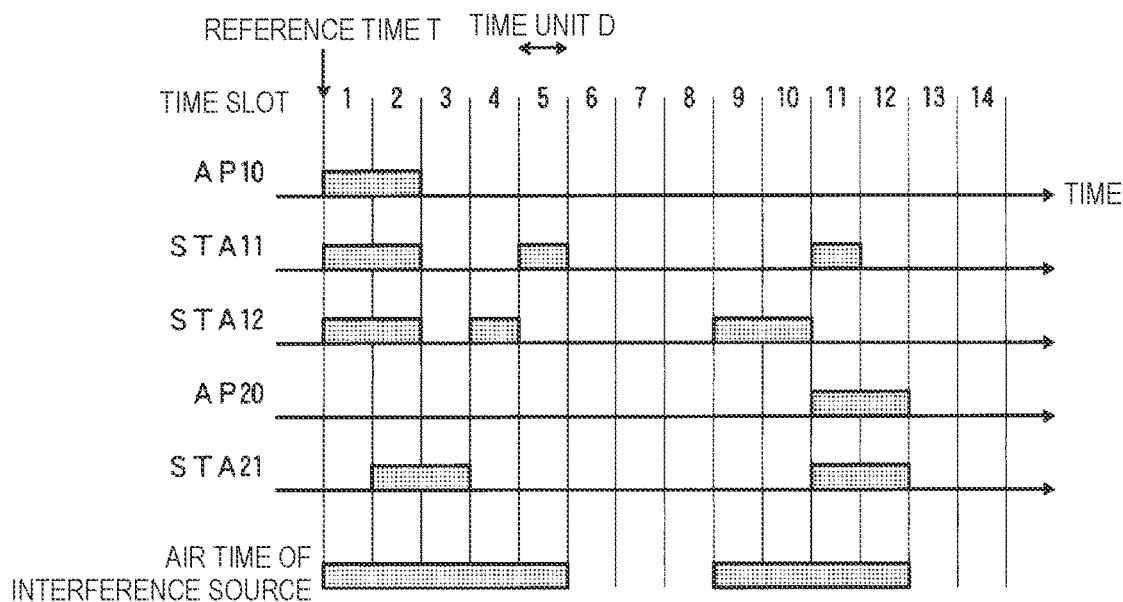

FIG. 1 shows a first embodiment of interference source air time information aggregation in a radio communication system of the present invention.

In FIG. 1, there are radio base stations (APs) 10 and 20 and radio terminals (STAs) 11, 12 and 21 under control of the radio base stations 10 and 20 as management target radio devices. Though only two radio base stations and three radio terminals are shown here for simplification, there may be more radio base stations and radio terminals. The radio base stations 10 and 20 communicate with an aggregation device (a server) 100 via a network not shown, and each of the radio terminals 11, 12 and 21 is connected to a radio base station to which the radio terminal belongs. It is assumed that an interference source signal transmitted by an interference source 51 is detected by each of the radio base station 10, the radio terminals 11 and 12, the radio base station 20 and the radio terminal 21.

Here, identification information about the interference source device is included in the interference source signal transmitted from the interference source 51, and the management target radio devices (the radio base station 10, the radio terminals 11 and 12, the radio base station 20 and the radio terminal 21) can identify the interference source 51 and grasp transmission time of the interference source signal transmitted by the interference source 51 by detecting the identification information.

The present invention is characterized in that, though the management target radio devices cannot detect the interference source signal transmitted by the interference source 51 while the management target radio devices are individually transmitting/receiving radio signals, it is possible for the aggregation device 100 to estimate air time of the interference source 51 by the aggregation device 100 aggregating/integrating pieces of detection information (pieces of air time information) about the interference source signal detected by the management target radio devices, while they are not performing transmission/reception, matching timings of the aggregation/integration.

Figure 2:
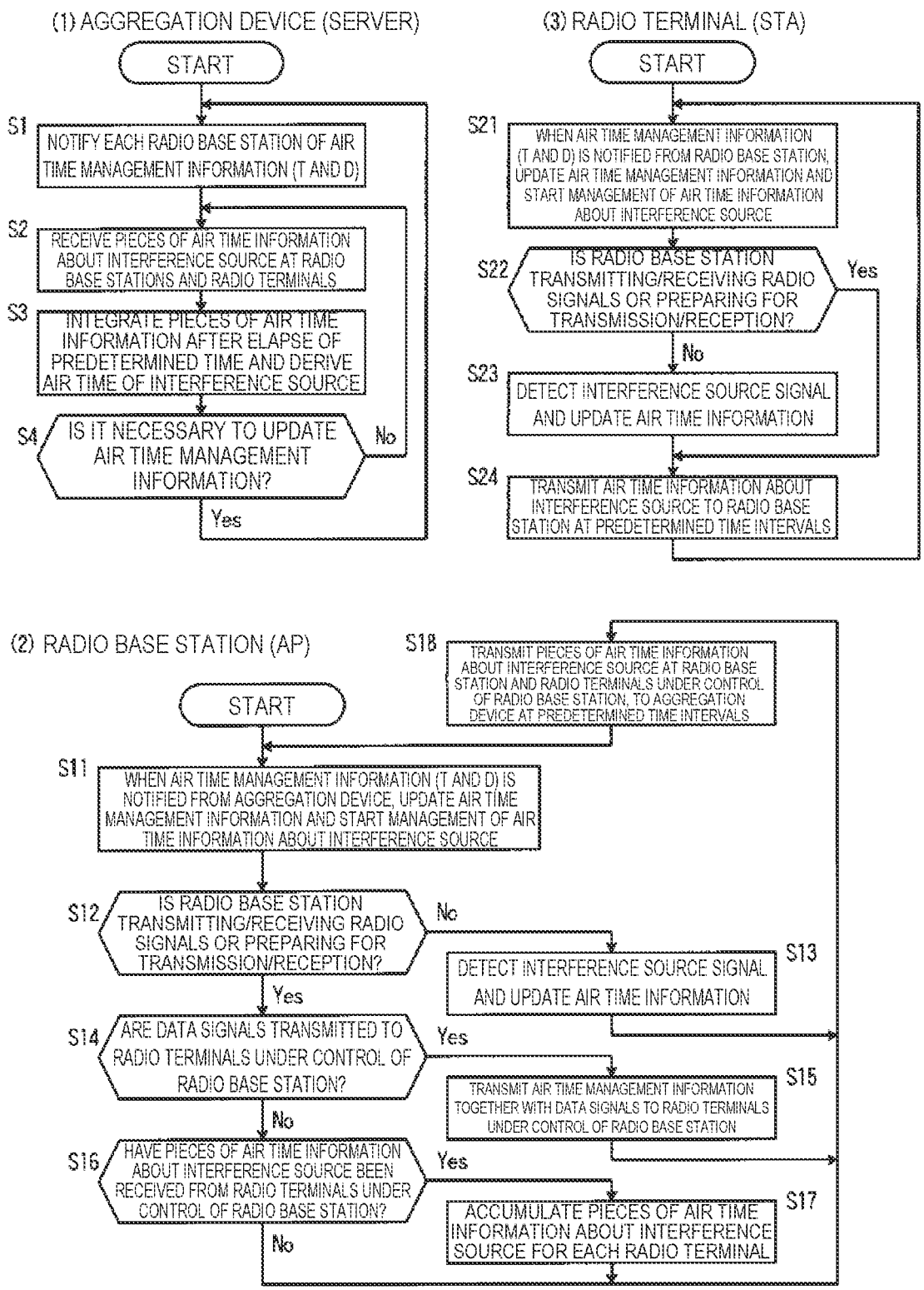
FIG. 2 is flowcharts showing processing procedure examples of the interference source air time information aggregation in the first embodiment of the present invention.

FIG. 2 shows processing procedure examples of the interference source air time information aggregation in the first embodiment of the present invention. FIG. 2 (1) shows a processing procedure example of an aggregation device (a server); FIG. 2 (2) shows a processing procedure example of a radio base station (AP); and FIG. 2 (3) shows a processing procedure example of a radio terminal (STA).

In FIG. 2, since the aggregation device aggregates/integrates pieces of air time information of an interference source signal detected by management target radio devices, it is necessary to match timings among the management target radio devices. The aggregation device manages the reference time T and the time unit D as air time management information and notifies each radio base station of the air time management information (S1). Note that, since the pieces of airtime information are aggregated/integrated for each interference source, identification information identifying a target interference source is also necessary, but it is omitted here.

When the radio base station is notified of the air time management information (T and D) from the aggregation device, the radio base station updates previous air time management information and starts management of air time information about an interference source (S11). Here, if the radio base station is not transmitting/receiving radio signals or preparing for transmission/reception (S12: No), the radio base station detects an interference source signal and updates air time information (S13). Further, if the radio base station is transmitting/receiving radio signals or preparing for transmission/reception (S12: Yes), and data signals are to be transmitted to radio terminals under control of the radio base station (S14: Yes), the radio base station transmits the air time management information together with the data signals to the radio terminals under the control of the radio base station (S15). Further, if data signals are not to be transmitted to the radio terminals under the control of the radio base station (S14: No), and pieces of air time information about the interference source are received from the radio terminals under the control of the radio base station (S16: Yes), the radio base station accumulates the pieces of airtime information about the interference source for each radio terminal (S17). The radio base station performs the above process at regular time intervals and transmits pieces of air time information about the interference source at the radio base station and the radio terminals under the control of the radio base stations, to the aggregation device (S18).

When the radio terminal is notified of the air time management information (T and D) from a radio base station to which the radio terminal belongs, the radio terminal updates previous air time management information and starts management of air time information about the interference source (S21). Here, if the radio terminal is not transmitting/receiving radio signals or preparing for transmission/reception (S22: No), the radio terminal detects the interference source signal and updates air time information (S23). The radio terminal transmits the updated air time information to the radio base stations at predetermined time intervals or each time of transmitting data to the radio base stations (S24).

The aggregation device receives pieces of air time information about the interference source at radio base stations and radio terminals under control of the radio base stations (S2), integrates the pieces of air time information for each time unit D after elapse of a predetermined time, derives air time of the interference source and updates a screen display and the like (S3). Here, the aggregation device returns to step S1 if it is necessary to update the air time management information (T and D), and returns to step S2 if it is not necessary to update the air time management information (T and D) (S4).

Note that the pieces of air time information about the interference source transmitted from the radio base stations and the radio terminals to the aggregation device includes the reference time T, the time unit D, identification information about the interference source, and whether an interference source signal is detected or not for each time unit D after the reference time T. Here, the reference time T and the time unit D that the aggregation device notifies the radio base stations and the radio terminals as the air time management information usually correspond to the reference time T and the time unit D transmitted from the radio base stations and the radio terminals to the aggregation device as the pieces of air time information. However, if update of the reference time T and the time unit D has not been performed in the radio base stations and the radio terminals due to non-delivery of the air time management information or the like, non-correspondence occurs. In this case, aggregation/integration is performed based on the pieces of air time information transmitted from the radio base stations and the radio terminals, and air time of the interference source is derived.

An example of aggregation/integration of pieces of air time information about an interference source in the first embodiment will be shown with reference to FIG. 1.

It is in time slots 1 and 2 as time units D with the reference time T as a starting point that the radio base station (AP) 10 detects an interference source signal. It is in time slots 1, 2, 5 and 11 that the radio terminal (STA) 11 detects the interference source signal. It is in time slots 1, 2, 4, 9 and 10 that the radio terminal (STA) 12 detects the interference source signal. It is in time slots 11 and 12 that the radio base station (AP) 20 detects the interference source signal. It is in time slots 2, 3, 11 and 12 that the radio terminal (STA) 21 detects the interference source signal.

For example, in the time slot 1, the AP 10 and the STAs 11 and 12 detect the interference source signal because they are not performing transmission/reception, and the AP 20 and the STAs 21 cannot detect the interference source signal because they are performing transmission/reception. In the time slot 4, the AP 10, the STA 11, the AP 20 and the STA 21 are performing transmission/reception and cannot detect the interference source signal, and only the STA 12 can detect the interference source signal because it is not performing transmission/reception. In time lots 6 to 8, the interference source signal cannot be detected because the interference source signal is not transmitted or because all of the AP 10, STAs 11 and 12, the AP 20, the STA 21 are performing transmission/reception.

Thus, detection of an interference source signal by APs and STAs can be performed when the interference source signal is transmitted from an interference source, and, furthermore, the APs and the STAs are not performing transmission/reception. On this assumption, the aggregation device 100 grasps air time of an interference source by aggregating/integrating (taking a logical sum of) pieces of air time information of radio devices for each time slot (each time unit D).

Second Embodiment

As the air time information, a management target radio device may add position information about the management target radio device and a detection level of an interference source signal, in addition to the reference time T, the time unit D, identification information about an interference source, and whether the interference source signal is detected or not for each time unit D after the reference time T. For example, at step S13 in FIG. 2 (2), when detecting an interference source signal, the radio base station updates air time information including a detection level of the interference source signal. Further, at step S23 in FIG. 2 (3), when detecting an interference source signal, the radio terminal updates air time information including a detection level of the interference source signal. Then, at step S18 in FIG. 2 (2), when transmitting pieces of air time information about an interference source at the radio base station and radio terminals to the aggregation device, the radio base station includes pieces of position information about the radio base station and the radio terminals.

Figure 3:
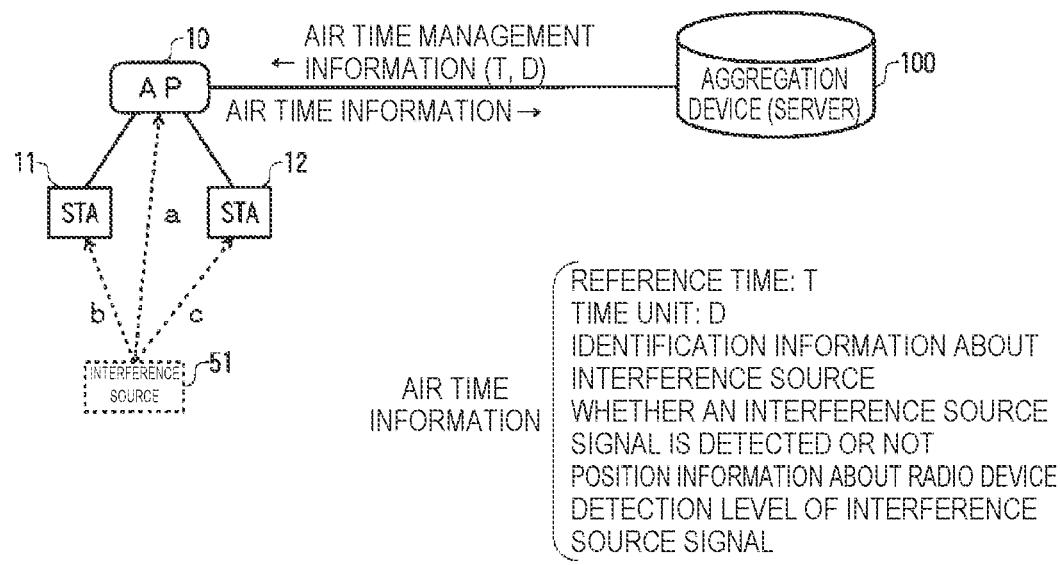
FIG. 3 is a diagram showing an interference source position estimation example in a second embodiment of the present invention.

Thereby, the aggregation device can calculate a ratio (a:b:c) of distances to the interference source 51, from detection levels of the interference source signal at the radio base station 10 and the radio terminals 11 and 12 under control of the radio base station 10 as shown in FIG. 3. The aggregation device 100 can estimate a position of the interference source 51 by three-point positioning, from pieces of position information about the radio base station 10 and the radio terminals 11 and 12, and the ratio (a:b:c) of the distances to the interference source 51.

Further, by adding detection levels of the interference source signal at the radio base station 20 and the radio terminal 21 under control of the radio base station 20 and pieces of position information about the radio base station 20 and the radio terminal 21 shown in FIG. 1, the aggregation device 100 can estimate the position of the interference source 51 more accurately.

Third Embodiment

The aggregation device 100 can take countermeasures by displaying air time information about the interference source 51 on a screen to visualize the air time information. For example, if the aggregation device 100 analyzes a tendency of the air time of the interference source 51 and knows patterns, such as concentrated use in a particular time zone and an unused state after use for a predetermined time, specific measures become possible.

Figure 4:
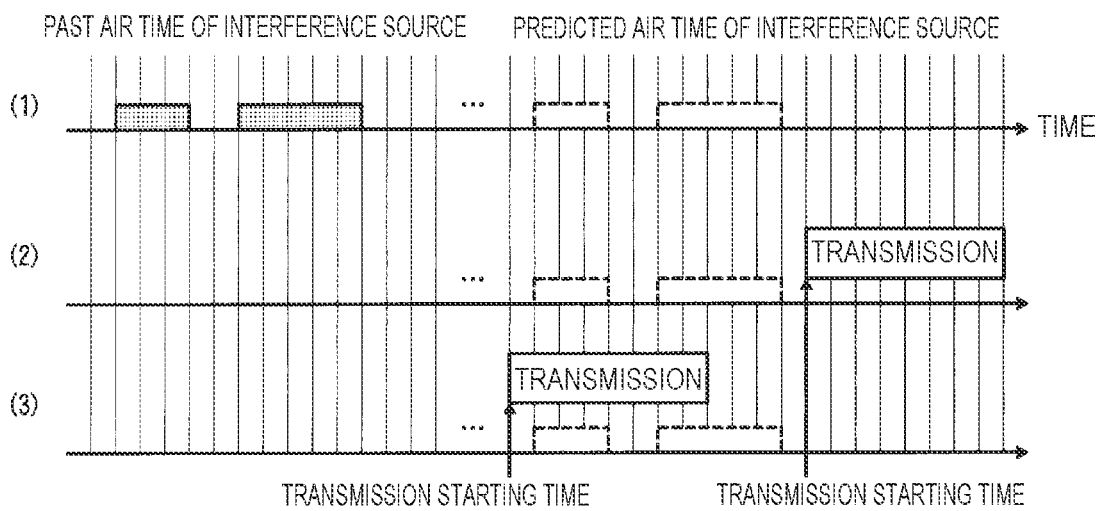
FIG. 4 is a diagram showing an example of use of air time of an interference source in a third embodiment of the present invention.
Figure 5:
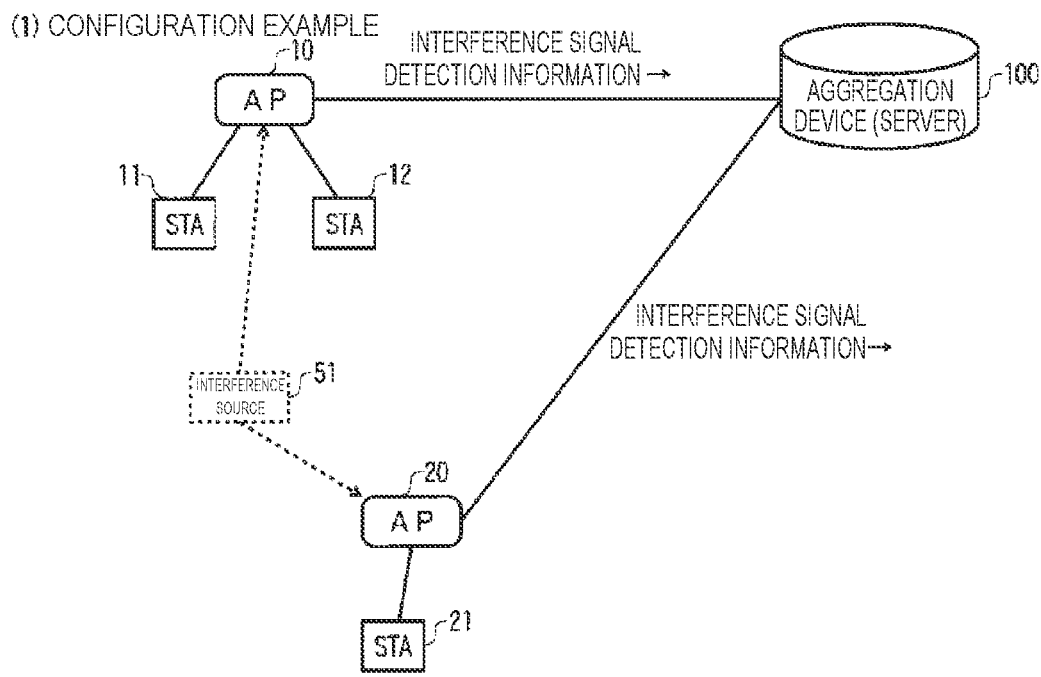
FIG. 5 is a diagram showing an example of detection of air time of an interference source in a conventional radio communication system.
Figure 5:
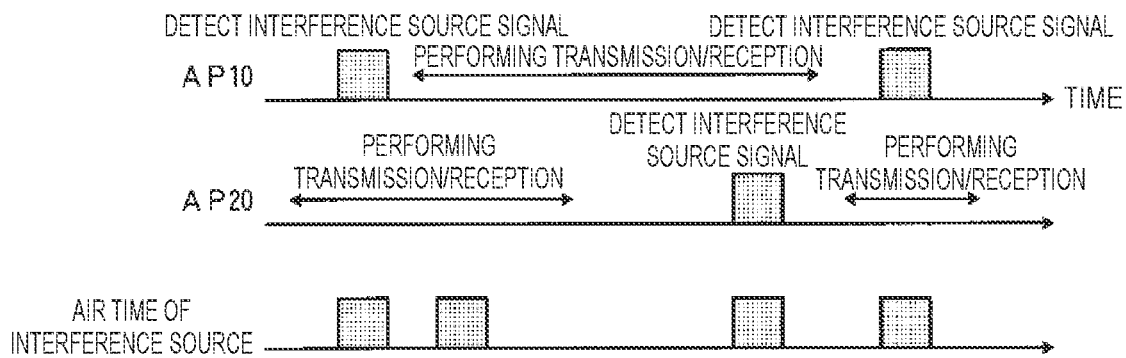

Furthermore, the aggregation device 100 predicts future air time from past air time of the interference source 51 as shown in FIG. 4 (1), and, in order to avoid a predicted transmission timing of the interference source 51, notifies management target radio devices of transmission starting time avoiding the transmission timing of the interference source 51, as a transmission timing advantageous to the management target radio devices, as shown in FIG. 4 (2). Or alternatively, by the aggregation device 100 notifying transmission starting time prior to the transmission timing of the interference source 51 as shown in FIG. 4 (3), it becomes possible for the management target radio devices to perform transmission without being influenced by the interference source 51. At this time, the interference source 51 is disabled to transmit a signal by carrier sense.

The aggregation device 100 described above can be realized by a computer and a computer program. The computer program can be stored in a computer-readable storage medium or can be provided via a network.

REFERENCE SIGNS LIST 10, 20 Radio base station (AP)
11, 12, 21 Radio terminal (STA)
51 Interference source
100 Aggregation device (server)

The invention claimed is:

1. A radio communication system comprising:
a plurality of radio devices, wherein:
each radio device among the plurality of radio devices is configured to detect an interference source signal transmitted by an interference source while the radio device is not performing transmission/reception of communications signals;
at least a first radio device and a second radio device among the plurality of radio devices are each configured to generate a respective piece of air time information specifying whether the interference source signal is detected or not detected for each predetermined time unit; and
for at least one predetermined time unit, only one of the first radio device or the second radio device is (i) not performing transmission/reception of communications signals and (ii) generating the respective piece of air time information; and
an aggregation device configured to estimate air time of the interference source by acquiring the respective pieces of air time information from the first and second radio devices and aggregate the acquired respective pieces of air time information by computing a logical sum of the acquired pieces of air time information for each predetermined time unit, wherein a result of the logical sum indicates that the interference source signal is present during the at least one predetermined time unit based on the interference source signal being detected, during the at least one predetermined time unit, by (i) the first radio device but not the second radio device or (ii) the second radio device but not the first radio device.

2. The radio communication system according to claim 1, wherein
the aggregation device is configured to manage reference time T and a time unit D in order to match timings of the plurality of radio devices detecting the interference source signal, and notify the plurality of radio devices of the reference time T and the time unit D as air time management information.

3. The radio communication system according to claim 2, wherein
the plurality of radio devices comprise at least one radio base station connected to the aggregation device and at least one radio terminal under control of the radio base station, and the air time management information is configured to be notified by the radio base station from the aggregation device and further notified by the radio terminal under the control of the radio base station from the radio base station.

4. The radio communication system according to claim 1, wherein
the plurality of radio devices are configured to transmit detection levels of the interference source signal and pieces of position information about the radio devices to the aggregation device as the pieces of air time information; and
the aggregation device is configured to estimate a position of the interference source from the detection levels of the interference source signal at the plurality of radio devices and the pieces of position information about the plurality of radio devices.

5. The radio communication system according to claim 1, wherein
the aggregation device is configured to analyze a tendency pattern of the estimated air time of the interference source, predict future air time of the interference source according to the tendency pattern, determine a transmission timing advantageous to the radio devices and notify the radio devices of the transmission timing.

6. The radio communication system according to claim 1, wherein:
for the at least one predetermined time unit, the respective piece of air time information generated by the first radio device specifies that the interference source signal is not detected by the first radio device while the first radio device is performing transmission/reception of communications signals; and
for the at least one predetermined time unit, the respective piece of air time information generated by the second radio device specifies that the interference source signal is detected by the second radio device while the second radio device is not performing transmission/reception of communications signals.

7. The radio communication system according to claim 1, wherein:
the result of the logical sum indicates that (i) the interference source signal is present during a respective time unit if at least one of the plurality of radio devices detects the interference source signal during the respective time unit and (ii) the interference source signal is not present during the respective time unit if none of the plurality of radio devices detects the interference source signal during the respective time unit.

8. The radio communication system according to claim 1, wherein the result of the logical sum over multiple different time periods indicates a set of the multiple different time periods during which the interference source was transmitting.

9. An aggregation device connected to a plurality of radio devices, wherein: each radio device among the plurality of radio devices is configured to detect an interference source signal transmitted by an interference source while the radio device is not performing transmission/reception of communications signals, at least a first radio device and a second radio device among the plurality of radio devices are each configured to generate a respective piece of air time information specifying whether the interference source signal is detected or not detected for each predetermined time unit, and for at least one predetermined time unit, only one of the first radio device or the second radio device is (i) not performing transmission/reception of communications signals and (ii) generating the respective piece of air time information, the aggregation device is configured to perform operations comprising:

estimating air time of the interference source by acquiring the respective pieces of air time information from the first and second radio devices and aggregate the acquired respective pieces of air time information by computing a logical sum of the acquired pieces of air time information for each predetermined time unit, wherein a result of the logical sum indicates that the interference source signal is present during the at least one predetermined time unit based on the interference source signal being detected, during the at least one predetermined time unit, by (i) the first radio device but not the second radio device or (ii) the second radio device but not the first radio device.

10. An interference source air time acquisition method comprising the steps of:

by each radio device among a plurality of radio devices, detecting an interference source signal transmitted by an interference source while the radio device is not performing transmission/reception of communications signals, wherein at least a first radio device and a second radio device among the plurality of radio devices each generate a respective piece of air time information specifying whether the interference source signal is detected or not detected for each predetermined time unit, and for at least one predetermined time unit, only one of the first radio device or the second radio device is (i) not performing transmission/reception of communications signals and (ii) generating the respective piece of air time information; and by an aggregation device connected to the plurality of radio devices, air time of the interference source by acquiring the respective pieces of air time information from the first and second radio devices and aggregate the acquired respective pieces of air time information by computing a logical sum of the acquired pieces of air time information for each predetermined time unit, wherein a result of the logical sum indicates that the interference source signal is present during the at least one predetermined time unit based on the interference source signal being detected, during the at least one predetermined time unit, by (i) the first radio device but not the second radio device or (ii) the second radio device but not the first radio device.

\* \* \* \* \*